FIG. 1.

INVENTORS.
ROBERT F. MILLER,
ROY E. MILLER,
BY

Linton and Linton

ATTORNEYS.

FIG. 2.

INVENTORS
ROBERT F. MILLER,
ROY E. MILLER,
BY
Linton and Linton
ATTORNEYS.

Feb. 4, 1969 R. F. MILLER ET AL 3,425,373
WORK PIECE SENSOR AND TAPE CUTOFF FOR SEWING MACHINES
Filed Oct. 31, 1967 Sheet 3 of 12

FIG. 3.

INVENTORS
ROBERT F. MILLER,
ROY E. MILLER,
BY

Linton and Linton
ATTORNEYS.

INVENTORS
ROBERT F. MILLER
ROY E. MILLER,
BY
Linton and Linton
ATTORNEYS.

Feb. 4, 1969  R. F. MILLER ETAL  3,425,373
WORK PIECE SENSOR AND TAPE CUTOFF FOR SEWING MACHINES
Filed Oct. 31, 1967   Sheet 10 of 12

FIG.19.

INVENTORS
ROBERT F. MILLER,
ROY E. MILLER,
BY
Linton and Linton
ATTORNEYS.

United States Patent Office 3,425,373
Patented Feb. 4, 1969

3,425,373
WORK PIECE SENSOR AND TAPE CUTOFF FOR SEWING MACHINES
Robert F. Miller, Robin Court, R.D. 2, and Roy E. Miller, 1301 Stuart Drive, both of Mechanicsburg, Pa. 17055
Continuation-in-part of application Ser. No. 504,395, Oct. 24, 1965. This application Oct. 31, 1967, Ser. No. 695,812
U.S. Cl. 112—130                           11 Claims
Int. Cl. D05b 37/04, 69/00; B26d 5/38

ABSTRACT OF THE DISCLOSURE

The present machine is for affixing binding tapes to articles and including attachments for such machines which allow the machine to be run either manually or automatically. In the automatic position of the attachments, they start the machine, upon presentation of a work piece to the machine, cut the tape at the start and finish of the work and stop the machine automatically. Also the operator can run the machine manually and stop the machine at any time when running the machine in said automatic position of the attachments.

---

The present application is a continuation-in-part of application Ser. No. 504,395, filed Oct. 24, 1965, now abandoned.

The present invention is directed to an improvement in tape applying machines and is more particularly concerned with machines for applying binding tape to articles.

It is the principal object of the present invention to provide a conventional sewing machine or adhesive tape applying machine with attachments which permit the machine to affix a binding tape on articles, for example, canvas or leather shoe uppers, and which machine can be either manually or automatically operated and when automatically operated presentation of the article and binding to the machine will automatically start the machine, the binding tape will automatically be cut at the start and finish of the work, and the machine will be stopped after the cutting of the binding tape and before a second work piece is presented to the machine.

A further and important object of the invention is to provide attachments for conventional sewing machines for attaching binding tape to a work piece and which attachments sense the movement of the binding and work piece during the sewing operation for automatically starting and running the sewing machine, cutting the binding from its supply thereof, cutting the binding a second time close to the finish of the work piece and stopping the operation of the sewing machine thereafter and yet which attachments permit the sewing machine to be manually operated for the starting and stopping thereof without the binding cutting steps.

A still further object of the invention is to provide an attachment for conventional types of sewing machines for applying binding to articles and which attachment can be used to automatically start and stop the sewing machine before and after the sewing of each article and severing the binding from a supply thereof as well as from the work piece between the starting and stopping of the sewing machine and which attachment further is long lasting, requiring little or no maintainance and reduces the ability required of the operator for such sewing machines while permitting an increase in production at less cost of the articles being sewn.

Further objects of the invention will be in part obvious and in part pointed out in the following description of the accompanying drawings in which.

Referring now more particularly to the accompanying drawings which include a conventional sewing machine by way of an example only for use with the present invention and wherein like and corresponding parts are designated by similar reference characters, numerals 1 and 2 indicates a pair of standards connected by a tie bar 3 upon which is pivotally supported a foot pedal 4 having an operating rod 5 pivotally connected thereto at 6. A table top 7 is supported by said standards and supports a box 7a containing relays, sensor operated micro-switches and indicator for the present attachment described more in detail hereinafter. A base 8 of a conventional sewing machine 9 is fixedly mounted on said table top, a box 7b is mounted beneath said table top and has an electrical lead-in cable 7c from box 7a and feed cable 7d and contains an off-on switch 7e and a manual-automatic switch 7f. Sewing machin 9 can be, for example, a model 47W sewing machine as produced by the Singer Company for use with the sensing and cut off attachments shown in FIGS. 1-8 inclusive or a model 108 sewing machine for use with the sensing and cut off attachments as shown in FIGS. 15 to 23. However, it is to be appreciated that the invention can be used with other types of sewing machines.

Figure 1:
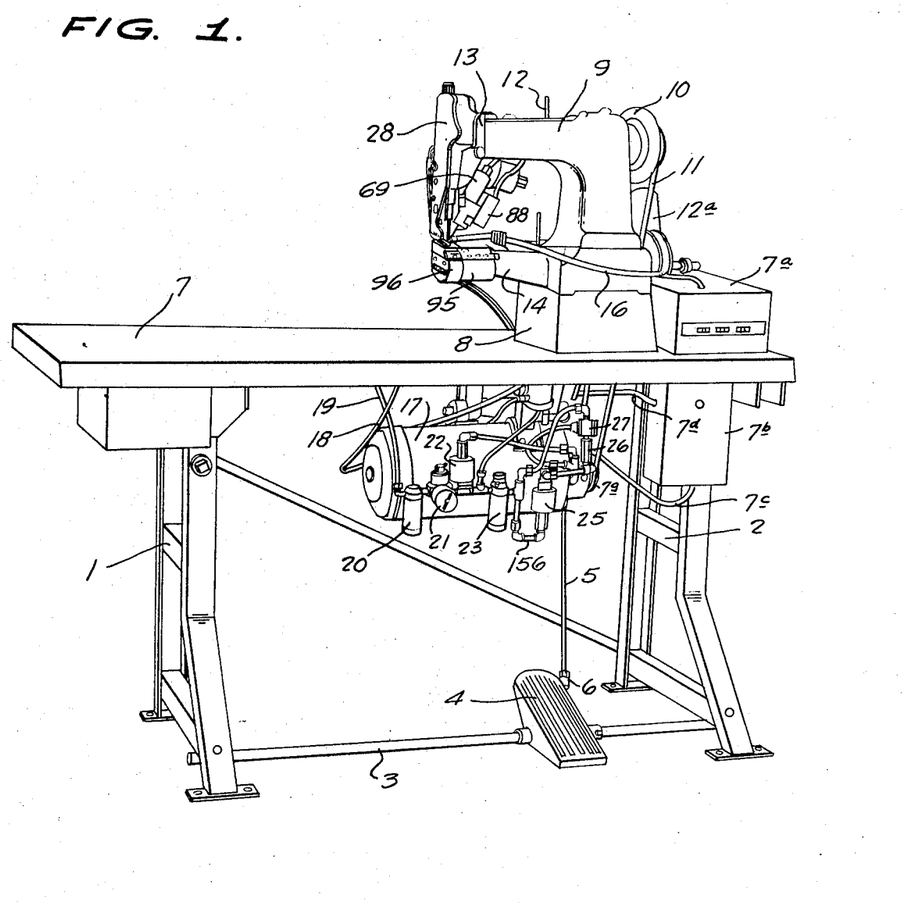
FIG. 1 is a perspective view of a sewing machine incorporating the present attachment.
Figures 24, 25:
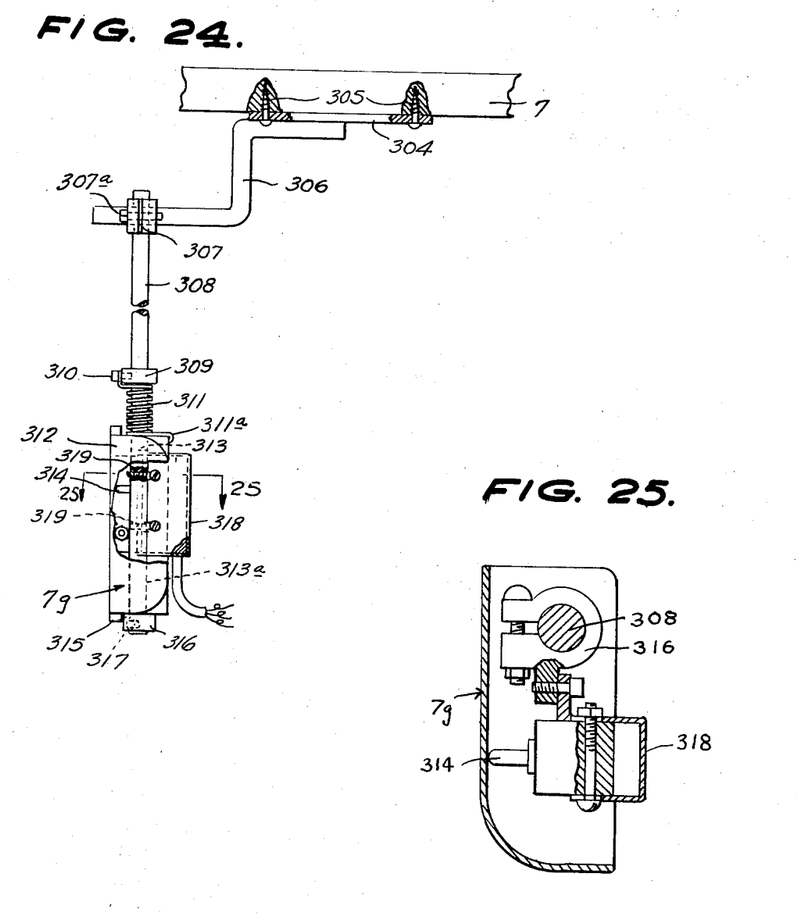
FIG. 24 is an enlarged front view, partly broken away, of the knee switch.
FIG. 25 is an enlarged cross sectional view taken on line 25—25 of FIG. 24.

A knee-switch 7g as shown in FIGS. 1 and 24 is attached to the bottom of table top 7 by screw 305 extending through plate 304. An arm 306 is attached to plate 304 as by welding and a clamp 307 consisting of two split rings fixedly joined together has arm 306 extending through one of said split rings and a rod 308 extending through the other split ring with screws 307a for tightening or loosening said split rings. A collar 309 has rod 308 extending therethrough and a set screw 310 extending through and in threaded engagement with collar 309 for positioning said collar on rod 308. A coil spring 311 has rod 308 extending therethrough and one end bent around set screw 310. A knee plate 312 has tubular portions 313 and 313a through which extends rod 308 pivotally supporting said knee-plate. An end 311a of spring 311 extends alongside said knee-plate while said knee-plate has a stop 315 normally engaging screw 317 extending through and in threaded engagement with collar 316 retaining collar 316 on rod 308. A micro-switch 318 is attached to rod 308 by screws 319 and has a plunger 314 to be operated at times by said knee-plate.

Said sewing machines have the conventional hand wheel 10 to which is attached an endless belt 11, a threadspool 12a and thread guide 12 and a sewing head 13 and base arm 14. Said head carries the conventional needle reciprocating arm 13a with needle 13b alongside pressor foot 13c above the feed dog 13d of the base arm 14. Operating rod 5 is connected to pressor foot 13c by conventional means (not shown) for raising and lowering said pressor foot. Said base arm also has pins 15 mounted thereon for guiding the binding tape 16 from a supply thereof, not shown, towards said pressor foot.

A combination brake and clutch unit 17 is fixedly supported beneath table top 7 and has an electric motor connected by wire 18 to a source of electrical current. Said brake and clutch unit is of the same type as shown in applicants' copending application Ser. No. 459,638, filed May 28, 1965, now U.S. Patent No. 3,359,931 dated Dec. 26, 1967, and which clutch and brake unit has a driven pulley 17a around which extends endless belt 11 for starting, running and stopping said sewing machine.

Pipe 19 is connected to a source of air under pressure (not shown) and has a filter unit 20 and pressure regulator 21 interconnected therein and is connected by tube 24 to a port of a solenoid exhaust valve 22. A second port of said solenoid exhaust valve is connected to an oiler unit 23 by tube 155 and said oiler unit is connected by tube 156 to a port of solenoid brake valve 25, and to a port of a solenoid drive valve 27.

The sensing and cut off unit of the present attachment has a plate 28 which is fixedly attached to the sewing head 13 of the sewing machine 9 as best shown in FIG. 1 and which plate has a lateral finger 29 with a slot 30 therein. Three tubes 31, 33, and 35 have nuts 32, 34 and 36 respectively fixedly attached to their ends while screws 37 extend through slot 30 to said nuts adjustably retaining said tube ends adjacent the bottom edge of said finger.

Plate 28 also has an opening 38 through which screw 39 extends into opening 55c attaching block 55 in threaded engagement therewith.

Plate 28 further has opening 40 with clamp 41 being attached to said plate by a screw 43 extending through opening 42 in said clamp and opening 40 retained by washer 44 and nut 45.

A cylinder block 46 has opening 47 through which extends screw 49 through washer 48 into an opening (not shown) in flange 50 of attaching block 55 in threaded engagement therewith. Said cylinder block further has an opening 51 with screw 53 extending through washer 52, opening 51 and opening 54 of attaching block 55 in threaded engagement therewith.

Said attaching block has an opening 55a in which is positioned a semi-circular sleeve 56 retained by screw 55b, providing a bearing for the sliding therethrough of a conventional pressor foot control element (not shown).

Figures 4, 5, 6:
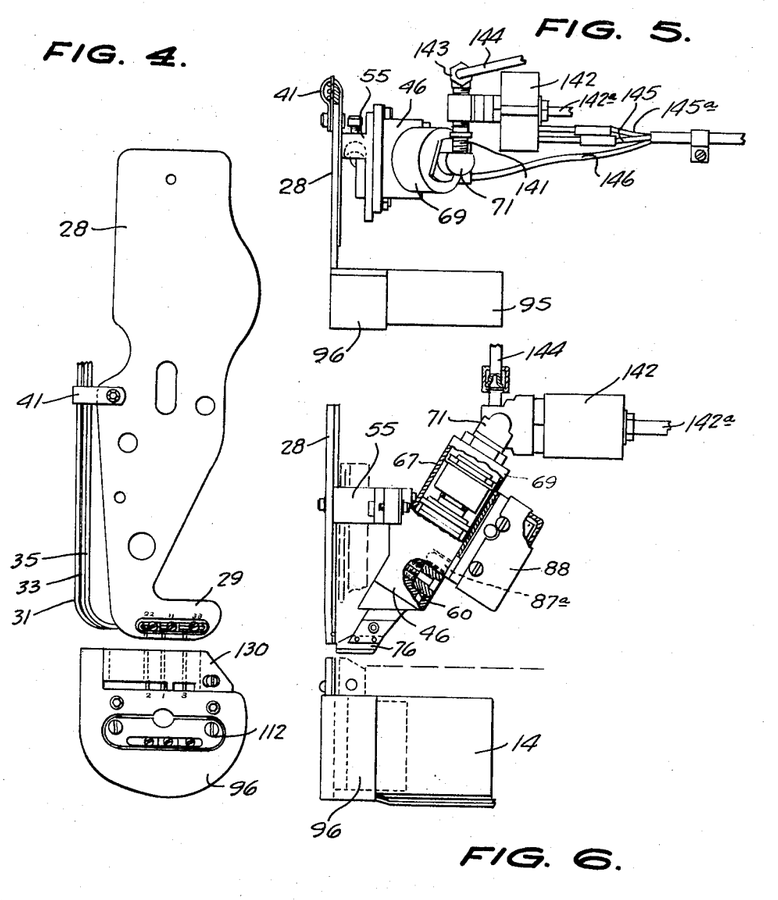
FIG. 4 is a front elevation of the present sensing attachments for the sewing machine.
FIG. 5 is a top foreshortened view of the sensing and cutting attachment.
FIG. 6 is a side elevation partly in section of the sensing and cutting attachment.
Figure 7:
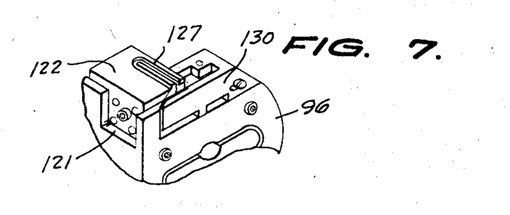
FIG. 7 is a perspective view of a portion of the knife follower saddle forming a part of the sensing attachment.

Said cylinder block also has a back recess 57 in which is positioned guide bar 60 against springs 58 and 59 while screws 63 and 64 pass through openings 61 and 62 in said guide bar and said springs into threaded openings in said cylinder block, see FIG. 6.

Said cylinder block 46 further has a bore 65 through which extends a piston rod 66. Piston rod 66 has a side recess 66a in which said guide bar is positioned and which provides cam 66b and a piston 67 upon the top of which is positioned a ring 68 with said piston and ring slidably mounted within the bore of cylinder 69 which is in threaded engagement with cylinder block 46 around bore 65. Cylinder 69 has a threaded opening 70 in which is positioned threaded end 72 of elbow 71 while a threaded nipple 73 is also in threaded engagement with said elbow.

Said piston rod further has a recessed end 74 with opening 75 therethrough while a knife blade 76 is positioned in said recess and a plate 77 is held against said knife blade by a screw 78 extending through opening 75 in threaded engagement therewith. Pins 76a extend through opening 76b in said piston rod, opening 76c in said knife blade and openings 76d in plate 77.

A bushing 79 is positioned on said piston rod below piston 67 while a spring 80 is mounted in bore 65 and pushes against said bushing 79 tending to move said piston rod upwardly drawing said knife blade 76 towards cylinder block 46.

A micro-switch base 81 has a side opening 82 for receiving screw 83 and a second opening 84 for receiving a screw 85 which screws extend into support 86 and micro-switch 87 for supporting the same in said base. A plunger 87a is slidably mounted in cylinder block 46, see FIG. 6, for being pushed by cam 66a of said piston rod when said piston rod reaches the end of its stroke to activate micro-switch 87. A cover 88 for base 81 has recesses 89 and 91 for receiving screws 90 and 92 which extend into openings 90a and 92a in said base 81 detachably retaining the cover thereon. Screws 94 extend through washers 93 and openings 94a in said microswitch base and into cylinder 46 as shown in FIG. 3 for attaching said micro-switch to said cylinder block.

Figure 2:
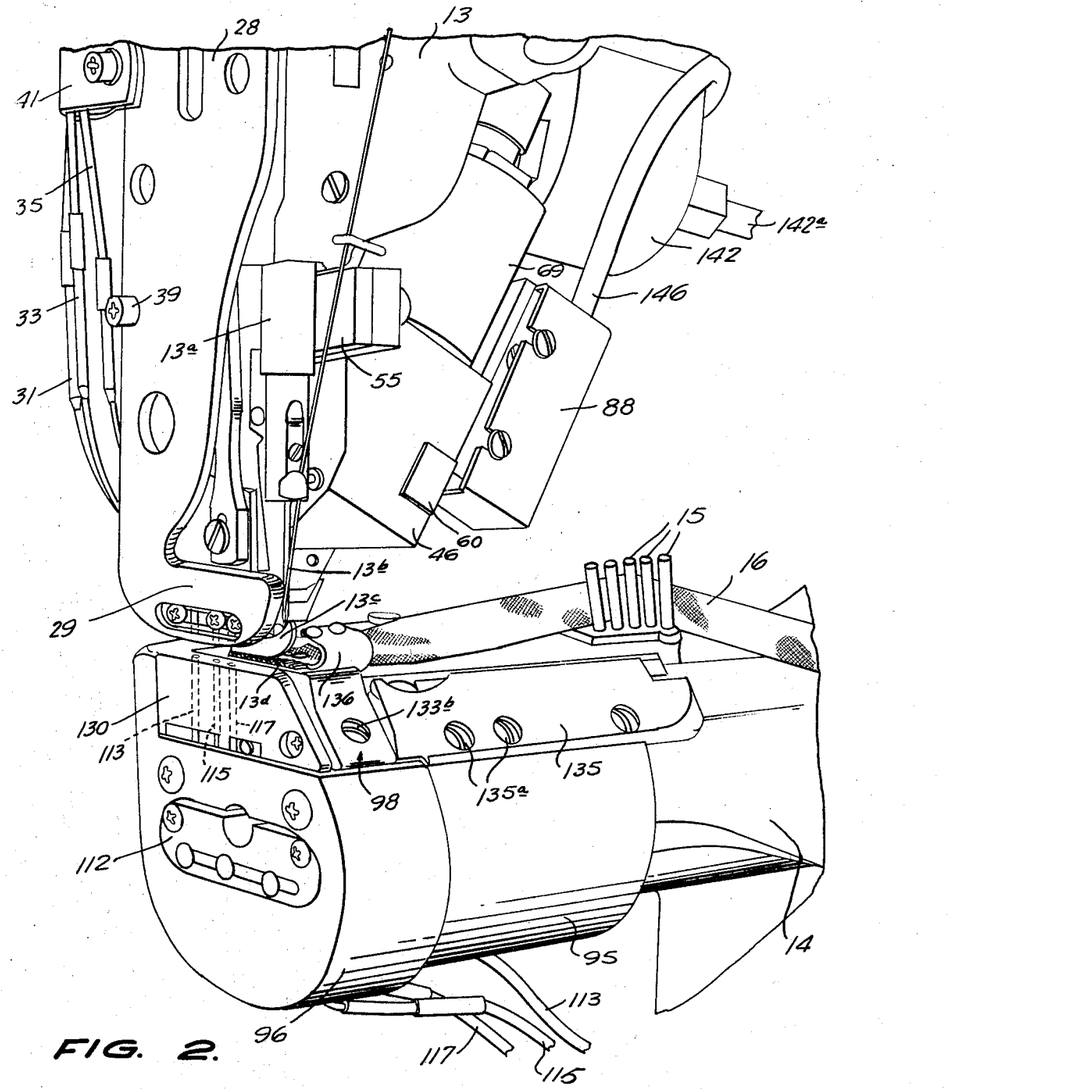
FIG. 2 is an enlarged perspective view of the binding, sewing and cutting portion of the sewing machine as viewed from FIG. 1.
Figure 3:
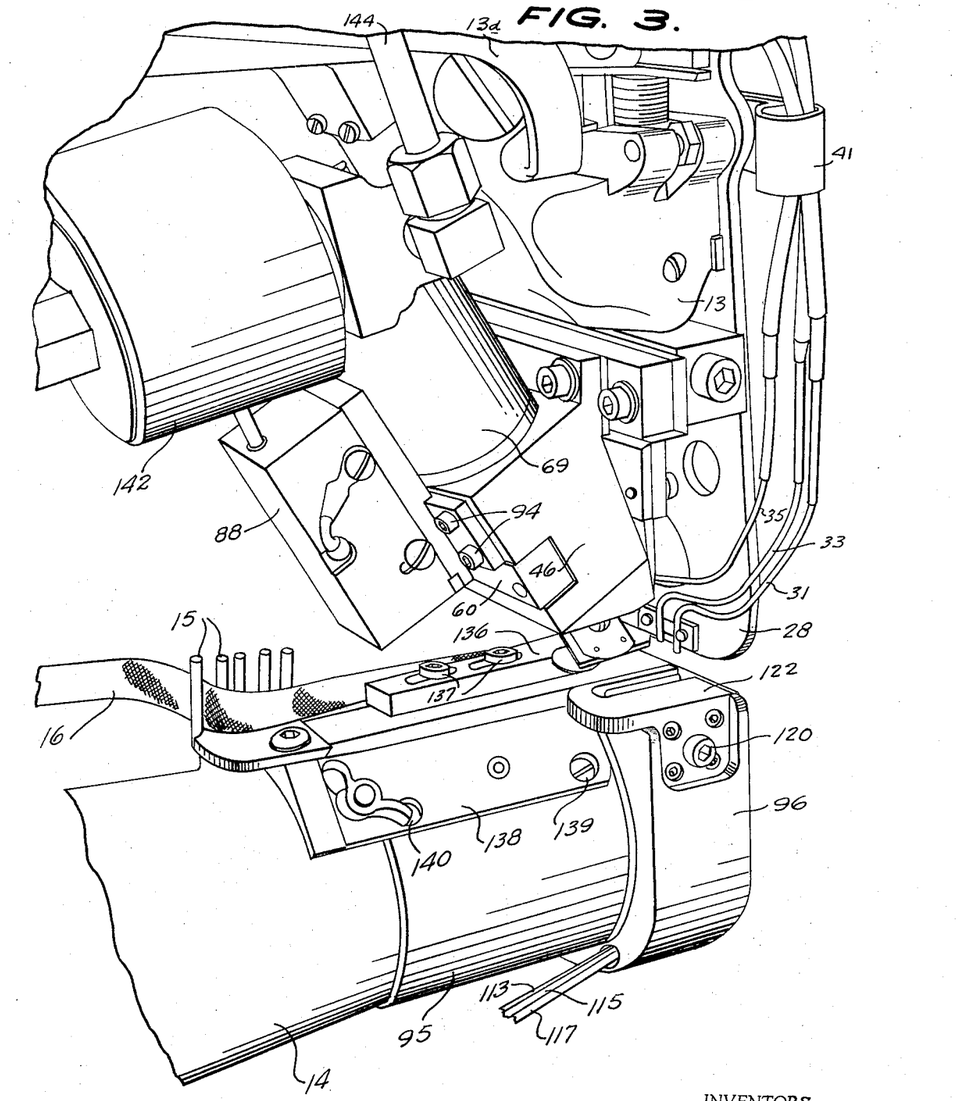
FIG. 3 is a further perspective view of the binding, sewing, and cutting portion of the sewing machine as viewed from the opposite side of FIG. 2.

A cylinder cover 95 extends around the lower portion of the sewing machine base arm 14 as shown in FIGS. 2 and 3 with a bedcap 96 against disc 97 of said sewing machine base arm.

A throat plate 98 is mounted upon said bedcap. Said disc 97 has opening 99 while bedcap 96 has an opening 100 for receiving a screw 101 in threaded engagement therewith. Likewise bedcap 96 has opening 104 and disc 97 opening 105 for receiving screw 106 in threaded engagement therewith retaining the same together. Openings 107 and 109 are provided in a sensor holding plate 112 for receiving screws 108 and 110 respectively while said sensor plate is inserted in opening 111 in said bedcap with screws 108 and 110 being in threaded engagement with openings 108a and 110a respectively of discs 97. Tubes 113, 115 and 117 have nuts 114, 116 and 118 respectively fixedly connected thereto while screws 119 extend through slot 120 in sensor holding plate 112 each in threaded engagement with one of said nuts for adjustably supporting said tubes with their open ends below throat plate 98.

Said bedcap has a side recess 121 in which is positioned a knife cutting bar block 122 with screws 124 extending through openings 123 and screw 126 extending through opening 125 of said knife bar block into said bedcap retaining the supported flange 127 on top face 128 of said bedcap and above said throat plate 98. Bedcap 96 further has a top face 129 upon which is seated finger guard 130. A screw 131 extends through openings 132 in said finger plate into openings 132a of disc 97. Side 133 of said throat plate 98 extends below face 128 of said bedcap while side 133a is mounted upon end 129b of said bedcap and has top openings 134 for the conventional feed dog of the sewing machine.

Plate 135 is attached to base arm 14 by screw 135a for retaining one side of cylinder cover 95 thereon.

A tape guide 136 is mounted upon the top of said cylinder arm and retained by screws 137 for twisting the binding tape 16 to a flat position beneath the pressor foot 13c. A second plate 138 is also mounted on said cylinder arm by screw 139 and thumb screw 140 for retaining the other end of said cylinder covering the said arm.

A nipple 73 is threadedly attached to elbow 71 and connected to tube 141 connected to air valve cutting solenoid 142, which has exhaust port 142a. A second nipple 143 is also connected to a second port of said solenoid cutting valve 142 and to a tube 144.

Wires 145 and 145a are connected to said solenoid cutting valve while wires 146 are connected to micro-switch 87.

Tube 147 is connected to tube 144 and one port of a start-stop micro-switch sensor block 174 while tubes 35 and 117 are attached to other ports of said micro-switch sensor block.

A tube 149 is also connected to tube 144 and one port of a second cut micro-switch sensor block 150 while tubes 31 and 113 are attached to other ports of said second cut micro-switch sensor block.

A tube 151 is also connected to tube 144 to one port of a first cut micro-switch sensor block 152 while tubes 33 and 115 are connected to other ports of said micro-switch sensor block 152.

Said micro-switch sensor blocks 174, 150 and 152 are more fully disclosed in FIGS. 10–13 inclusive and will be described more in detail hereinafter.

A solenoid shut off valve 153 has tube 154 connected to one port thereof and also to tube 155 and a second port connected to tube 144. A tube 156 connects the lubricating cylinder 23 to one port of drive solenoid valve 27 and by a tube 157 to a port of brake solenoid valve 25. A second port of said brake solenoid valve 25 is connected by tube 159 to the brake operating port of the clutch and brake unit 17. A tube 161 connects a port of the drive solenoid valve 27 to the drive port of said brake and clutch unit 17 and includes a flow control 160. A tube 162 connects the exhaust port of said drive solenoid valve 27 to the exhaust port of exhaust solenoid valve 22 and by tube 163 to a further port of the brake solenoid valve 25. Tube 164 connects tube 162 with the exhaust port of said brake and clutch unit 17.

Wire 165 is connected to the solenoid of shut-off solenoid valve 153 as is a wire 166 which is also connected to wire 145. Wire 167 is connected to the exhaust solenoid valve 22 as is wire 168 which is also connected to wire 169 to brake solenoid valve 25 and to the drive solenoid valve 27. A wire 170 is connected to both said brake and drive solenoid valves 25 and 27 and to a wire 171. Also wire 172 is connected to wire 168.

The electrical connection posts for the drive motor of the clutch and brake unit 17 are indicated at 173.

Figure 9A:
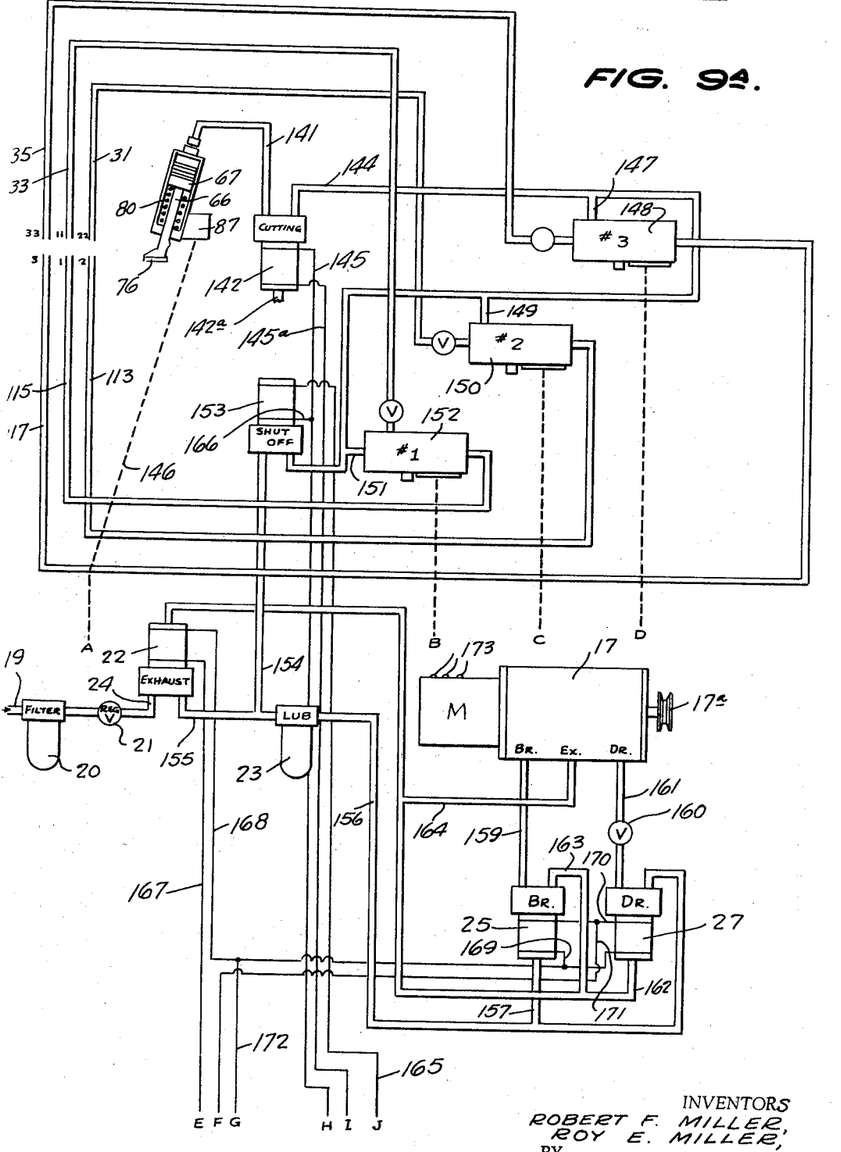
FIGS. 9a and 9b are diagrammatic showings of the pneumatic and electrical circuit for the present invention.
Figure 9B:
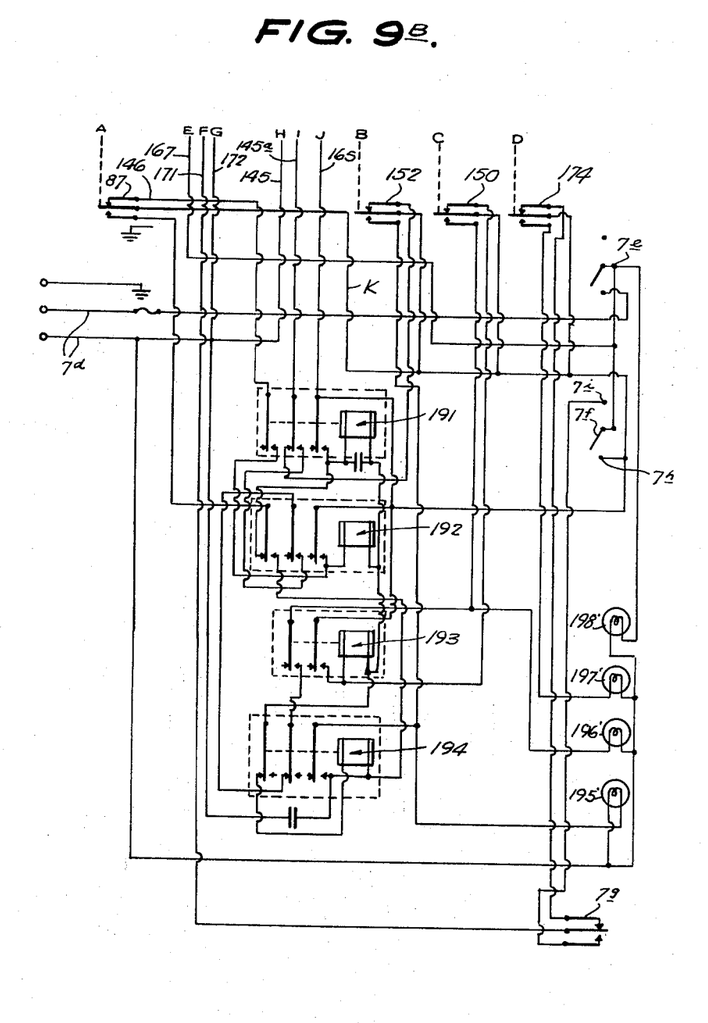
Figures 10, 11:
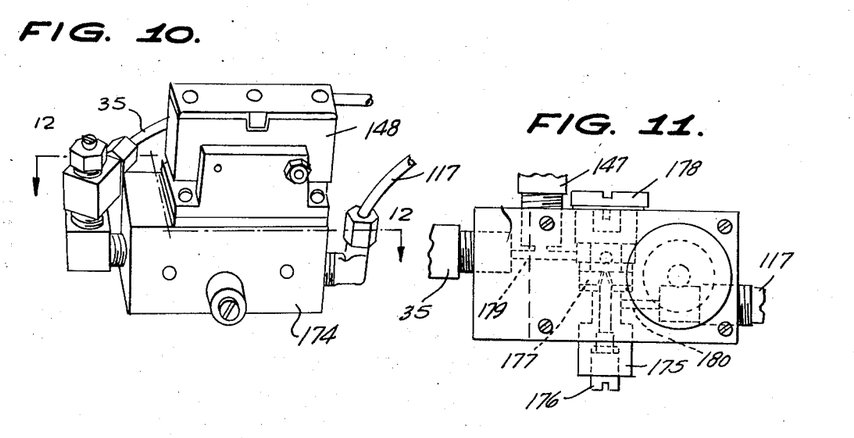
FIG. 10 is a perspective view of a sensor forming part of the present pneumatic circuit.
FIG. 11 is a top view of said sensor with interior details shown in dotted lines.
Figures 12, 13, 14:
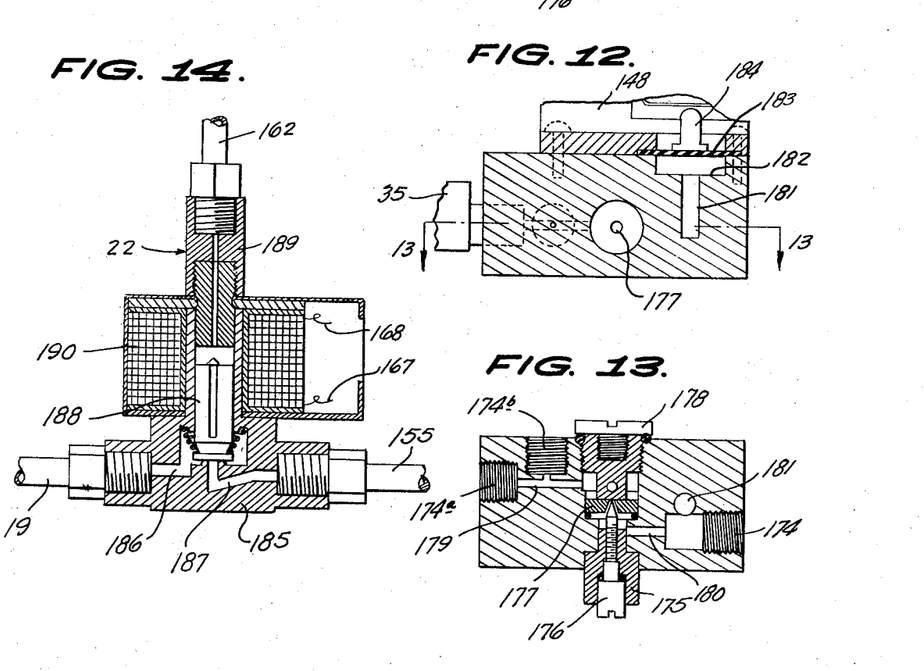
FIG. 12 is a cross sectional view taken on line 12—12 of FIG. 10.
FIG. 13 is a cross sectional view taken on lines 13—13 of FIG. 12.
FIG. 14 is a cross sectional view taken of an electrically operated solenoid valve forming part of the present attachment.

The micro-switch 87 of FIG. 9a is tied into FIG. 9b by dotted lines A, while sensor blocks 152, 150 and 174 of FIG. 9a are tied into their micro-switches of the same number in FIG. 9b by lines B, C, and D respectively. Likewise wires 167, 171, 172, 145, 145a, and 165 of FIG. 9a continue on FIG. 9b as E, F, G, H, I, and J, respectively.

The micro-switch sensor blocks 174, 150 and 152 are similar and therefore, micro-switch sensor block 174 is shown in FIGS. 10–13 as representative of all three. Said micro-switch sensor block 174 has a bushing 175 extending therein and which bushing has adjusting stem 176 in threaded engagement therewith and extending therethrough into an air control seating disc 177 having a tapered opening providing a needle valve. Said disc is held within said sensor block by a cap 178 in threaded engagement with said block. A passageway 179 leads to one side of said seating disc 177 and to threaded ports 174a and 174b. A threaded port 174c extends into said sensor block and connects with a passageway 180 adjacent said adjusting stem and also in communication with a lateral passageway 181 leading to recess 182 in said block. A diaphragm 183 extends across recess 182 and is held thereon by micro-switch 148 while a plunger 184 is mounted on said diaphragm and positioned for operating said micro-switch.

Tube 35 is connected to port 174a while tube 147 is connected to port 174b and tube 117 is connected to port 174 by being in threaded engagement therewith.

The amount of air to pass from passageway 179 to 180 is controlled by adjusting stem 176 relative to disc 177.

When the pressure within passageway 181 is relatively high as when a work piece is between the ends of tubes 35 and 117 stopping the flow of air therefrom diaphragm 183 is moved upwardly operating micro-switch 174. However, when the pressure below diaphragm 183 is lowered as when said work piece passes from between the ends of tube 35 and 117 the diaphragm is lowered again operating micro-switch 148.

The exhaust solenoid 22 is a conventional three-way solenoid valve such as are solenoid valves 142, 25 and 27 as produced by the Automatic Switch Company. An enlarged view of solenoid valve 22 is shown in cross section in FIG. 14 as an example of all three solenoid valves. Said valve has base 185 with a passageway 186 to which is connected tube 24 and a center passageway 187 connected to tube 155. A plunger 188 is slidably mounted in the bore of tube 189 surrounded by an electrically operated solenoid 190 connected to wires 167 and 168 and said plunger normally closes passageway 187. The bore of tube 189 further is connected to tube 162. Thus when air enters from tube 19 into passageway 186 and the solenoid is deenergized said air passes around plunger 188 through tubes 189 and 162 to the exhaust port of the clutch and brake unit 17. However, when solenoid 190 is energized it raises plunger 188 permitting the air to pass from passageway 186 to passageway 187 to tube 155.

Solenoid valve 153 is a conventional two-way solenoid valve which can be obtained from the Automatic Switch Company and is similar to solenoid valve 22 except that it does not have the exhaust opening but a plunger such as 188 merely opens and closes two passageways similar to passageways 186 and 185 to permit the connecting and disconnecting of tubes 144 and 154 by solenoid valve 153.

In the operation of the sewing machine with the present attachments connected thereto air under pressure is fed into tube 19 while electrical current is supplied to posts 173 for driving the clutch and brake unit and also to cable 7d. With the switch 7f in its manual position, that is connected to point 7i and switch 7e closed, current is sent through line E to the exhaust solenoid 22 supplying air to tube 155 to tube 154 and to tube 156 and by tube 157 to solenoid brake valve 25 and also to solenoid drive valve 27. At the same time current is supplied to switch 7g, but will proceed no further due to switch 7g being in its normally open position as shown in FIG. 9b. When the operator moves the knee lever controlling switch 7g, said switch will be closed directing current through line F to the brake and drive solenoid valves 25 and 27 operating the same driving the sewing machine allowing the operator to perform a sewing operation without the automatic controls. That is the cut off unit 69 will not cut the binding 16 since shut off valve 153 is in its closed position. Whenever the knee lever is released by the operator switch 7g will open stopping the sewing machine. Thus when solenoid valve 25 is deenergized air will pass from tube 157 to tube 159 to the brake port of the clutch and brake unit 17 stopping pulley 17a and thus sewing machine 9. However, when said solenoid valve 25 is energized then tube 157 is closed and air from tube 159 is exhausted through tubes 163 and 164 to the exhaust port of unit 17 leaving pulley 17a free.

When solenoid valve 27 is energized air passes from tube 157 therethrough to tube 161 and the drive port of unit 17 causing the rotation of pulley 17a running the sewing machine 9. However, when said solenoid valve 27 is deenergized air from tube 161 is exhausted through tube 162.

With switch 7 in its automatic position, that is connected to point 7h and switch 7e closed, current is sent through line E to the exhaust solenoid 22 and through line J to the shut-off solenoid 153 controlling the air feed to the cutter 67 and sensors #1, 2 and 3. At the same time current will be supplied to the common lead K to the micro-switches 87, 152, 150 and 174 and thus lines B, C and D, as micro-switches 152, 150 and 174 will be closed as shown in FIG. 9b, when work is presented to the sewing machine. When there is no work in the sewing machine said common lead will be connected to the lower contacts of the micro-switches 152, 150 and 174. The current from said common lead to micro-switch 87 will feed through micro-switch 87 back to the lefthand switch on relay 191. As relay 191 is not energized at this point the lefthand switch thereof will be open preventing the current from proceeding further in the circuit. The current passing through micro-switch 152, when there is no work in the sewing machine, will pass from the common lead K through the lower contact of micro-switch 152 to energize light 195'. At the same time the current is passing to the right hand switch of relay 194, but since the switch is open the current will proceed no further. The current from common lead K to micro-switch 150 will pass through the lower contact thereof to energize light 196' and at the same time goes to the left hand switch of relay 193 which is open preventing the current from proceeding further. The current from switch 174 passes through the lower contact thereof to energize lamp 197'.

When a work piece such as a canvas or leather shoe upper is passed between tubes 35 and 117 an increase in pressure occurs in the micro-switch sensor block 174 closing said micro-switch as shown in FIG. 9b at which time the current is supplied from the common lead K on micro-switch 174 through switch 7g which is in its closed position also as shown in FIG. 9b and goes from there to the brake and drive solenoids 25 and 27 driving the sewing machine. As long as the work piece remains in the sewing machine micro-switch 174 will remain closed and the sewing machine will continue to sew.

As the work piece is moved to between tubes 33 and 115 the pressure in the micro-switch sensor block 152 increases and said micro-switch 152 will move to the position shown in FIG. 9b at which time current will be fed from the common lead K through micro-switch 152 to the normally closed contact of the middle switch of relay 191 and through this middle switch to the cutting solenoid 142 which opens and admits air to the top of cylinder 80 moving the cutting knife 76 down to cut the binding 16. As the piston rod 66 approaches the end of its downward stroke cam 66d pushes plunger 87a against micro-switch 87 moving the same so that the common lead K will be joined to the lower contact of micro-switch 87 sending current to the left hand switch of relay 192 and therethrough to the coil of relay 191 energizing said coil. As the coil of relay 191 is energized it will move the three switches of relay 191 to the right and at this point the power connection through the middle switch of relay 191 to the cutting solenoid 142 will be broken de-energizing said cutting solenoid 142 releasing the air above piston 67 through exhaust port 142a of the cutting solenoid 142 so that spring 80 returns the cutter 76 to its upper position. At the same time a holding circuit will be formed through the right hand switch of relay 191, to hold the coil of relay 191 energized. As the cutter 76 returns to its upper position the micro-switch 87 will once again move to the position shown in FIG. 9b thereby sending current from the common lead K through the upper portion of micro-switch 87 through the left hand switch of relay 191 to the coil of relay 192 energizing the coil thereof, moving the switches of relay 192 to the right forming the holding circuit for the coil of relay 192 keeping it energized and holding its switches in their right hand position.

As the work piece is moved between tubes 31 and 113 air pressure increases in the micro-switch sensor block 150 moving the micro-switch thereof to its position shown in FIG. 9b and when the micro-switch closes as shown, current will be sent from the common lead K to the coil of relay 193 moving the switches of relay 193 to the right and forming a holding circuit retaining the coil of relay 193 in an energized condition and the switches thereof in their right hand position. The relays and their switches will remain in these positions during the sewing operation on the work piece. Relay 191 thus cancels the current to the cutting solenoid 142 so that knife 76 does not make a second cut of the binding 16 until the work piece leaves the tube 31 and 113.

As the work piece is further moved clearing the sensing tubes 31 and 113, micro-switch 174 will move to its lower position stopping the sewing machine. Micro-switch 152 will also move to its lower position at which time current will be supplied to the right hand switch of relay 194 but will proceed no further due to the fact that relay 194 is in its de-energized position. Light 195 will also be lighted. When the work piece clears the sensor tubes 31 and 113 micro-switch 150 will move to its lower position energizing lamp 196, but current will be fed through the left hand switch of relay 193 which is in its right hand position and the current thus will pass through the middle switch of relay 194 back through the middle switch of relay 192 which is in its right hand position, and back through the middle switch of relay 191 which is in its right hand position, to cutting solenoid 142. The cutter blade 76 will then be caused to descend until it reaches the bottom of its stroke cutting binding 16 close to the finish of the work piece and moving micro-switch 87 so that the common lead K is connected to the lower contact of micro-switch 87 feeding current through the left hand switch of relay 192 which is in its right hand position, and to the coil of relay 194 energizing the same, moving its switches to the right. When this occurs the current being fed to the cutting solenoid 142 will be broken by the middle switch of relay 194 permitting cutter blade 76 to return to its upper position. At the same time the return circuit for the coils of relays 191, 192 and 193 which goes through the left hand switch of relay 194 will be broken thereby de-energizing each of these relays allowing their switches to move to their left hand positions. Simultaneously with the return of the cutter blade 76 to its upper position, micro-switch 87 again moves to its position as shown in FIG. 9b and the current from the common lead K goes to the open left hand switch of relay 191.

When relay 194 was energized, a holding circuit was formed through the micro-switch 152 and the right hand switch of relay 194 to maintain the relay 194 in its energized position and with its switches in their right hand position. Relay 194 remains energized between the introduction of work pieces to the sewing machine. When a further work piece is fed to the sewing machine and as soon as micro-switch 152 moves to its position as shown in FIG. 9b, the circuit to relay 194 is broken allowing the switches of relay 194 to move to their left hand position and the operation of the sewing machine and attachments thereto will be the same as previously described for the first work piece.

Lights 195', 196' and 197' are only lit as long as there is no work piece in the sewing machine and they will be turned off as soon as micro-switches 150, 152 and 174 are actuated. Further light 198' is always lit as the current has been turned on to the sewing machine whether switch 7f is in the manual or automatic position.

In the aforementioned description of the operation of the present apparatus reference to right, left, up or down for the elements refers to these directions on FIG. 9b.

Lamps 195', 196', 197', and 198' are connected to cable 7d and lamp 195' is connected to micro-switch 152, lamp 196' to micro-switch 150 lamp 197' to micro-switch 174 and lamp 198' to switch 7e. Thus, lights 195', 196', and 197' are only lit as long as there is no work piece in the sewing machine and they will be turned off as soon as micro-switches 152, 150 and 174 are actuated. Further light 198' is always lit as long as the current is turned on to the sewing machine whether switch 7f is in the manual or automatic position.

FIGS. 15–23 inclusive disclose a modified form of sensor and tape cut-off unit particularly for use with a model 108 sewing machine as produced by the Singer Company. Certain elements of this modified device are similar to those used in the device shown in FIG. 8 and have been given corresponding reference numerals.

Block 195 is a conventional part of said sewing machine and a plate 196 is mounted on the top thereof having openings 197 in which are positioned tubular washers 198 above which are mounted rings 198a. A block 199 is mounted upon plate 196 and has openings 200 which match with openings 197 for receiving screws 201 therethrough into threaded engagement with block 195. Block 199 also has a recess 202 in one end and an inverted T-shaped groove 203 extending across the top thereof.

A plate 204 has a tongue 205 extending into recess 202 and having an opening 209 coinciding with opening 206 in plate 196 while a spring 207 extends into opening 205 and screw 208 extends through said spring and openings 205 and 206 into threaded engagement with block 195.

Bolt 210 has its head slidably positioned in recess 203 and extends through opening 211, washer 212 and has nut 213 thereon retaining arm 214 on block 199 with said arm extending laterally therefrom. Said arm further has a curved support 215 extending laterally of the same with a flat end 216 through which extends slots 217 for receiving screws 218 therethrough to engage openings 301 in cylinder block 279 for retaining said cylinder block on the right hand side of support 215. An L-shaped plate 219 is fastened to end 216 of support 215 by screws 222 which extend through washers 221, openings 220 in said L-shaped plate and into threaded openings 223 in end 216. Support 215 has opening 224 against which is positioned the washer 225 and through which extends screw 226 into a threaded opening 303 in the cylinder block 279. L-shaped plate 219 also has openings 227 which match with openings 228a of a sensor arm 228 with screws (not shown) passing through openings 228a into threaded engagement with openings 227. A spring 230 has an opening 229 for a screw (not shown) in threaded engagement with opening 231 in said sensor arm whereby said spring extends across slot 234. Said sensor arm also has slot 232 through which extends screws 233 into threaded openings in block 32, 34 and 36 fixedly connected to and supporting sensor tubes 31, 33, and 35 respectively.

A bed extension arm 235 has an end seated on recess 235a in the bottom of arm 214 and has openings 236 with screws 238 extending through washers 237 and said openings 236 into threaded openings (not shown) in recess 235a whereby said bar extends beneath support 215. Said bar also has a lateral groove 239 in the opposite end thereof together with a flat top face 240. A knife cutting bar 241 has key 242 seated in recess 239 and a longitudinal recess 243. A knife follower 244 is mounted upon face 240 of bar 235 below recess 243 and has a slanting edge 245 extending into said recess 243. Knife cutting bar 241 also has a threaded opening 247 in alignment with opening 246 in said arm 235 while a screw 249 extends through washer 248 and opening 246 into threaded engagement with openings 247.

Said knife follower 244 has an opening 250 in alignment with opening 251 in said arm 235 and a screw 253 extends through washer 252 and threaded opening 251 into threaded engagement with opening 250. A pressor foot 254 is shown for use with the present device and has an opening 255 for receiving a screw for attachment to the conventional pressor foot lifting rod (not shown) of the sewing machine.

A second sensor support 256 has an elongated slot 257 in which are positioned the nuts 258 fixedly attached to the sensor tubes 113, 115, and 117 with said nuts retained in slot 257 by screws 259 in threaded engagement with openings 260 and against nuts 258 whereby tubes 113, 115 and 117 can be adjustably aligned with tubes 31, 33, and 35 respectively. Said sensor support 256 also has an opening 261 through which extends a screw 262 into threaded opening 262a of bar 235. A throat plate 263 has a recess 263a receiving the tongue 204a of plate 204 and also an opening 264 having a screw extending into a threaded opening (not shown) in the end of sensor bar 256.

Support 215 has threaded openings 265 matched with openings 267 in a plate 266 with screws 268 extending through the openings 266 into threaded engagement with openings 265. Plate 266 also has openings 269 through which extends screw 270 into the threaded openings (not shown) in the bottom of the solenoid valve 271 in threaded engagement therewith. Said solenoid valve also has a threaded opening 272 with nipple 273 therein and connected to a pipe coupling 273a connecting the same to tube 144. A second nipple 274 is connected to the opposite side of said solenoid valve and also to a pipe coupling 275 for being joined to tube 141. A cover 276 is mounted upon the end of said solenoid valve and has exhaust opening 142a for said solenoid opening therethrough.

Figure 8:
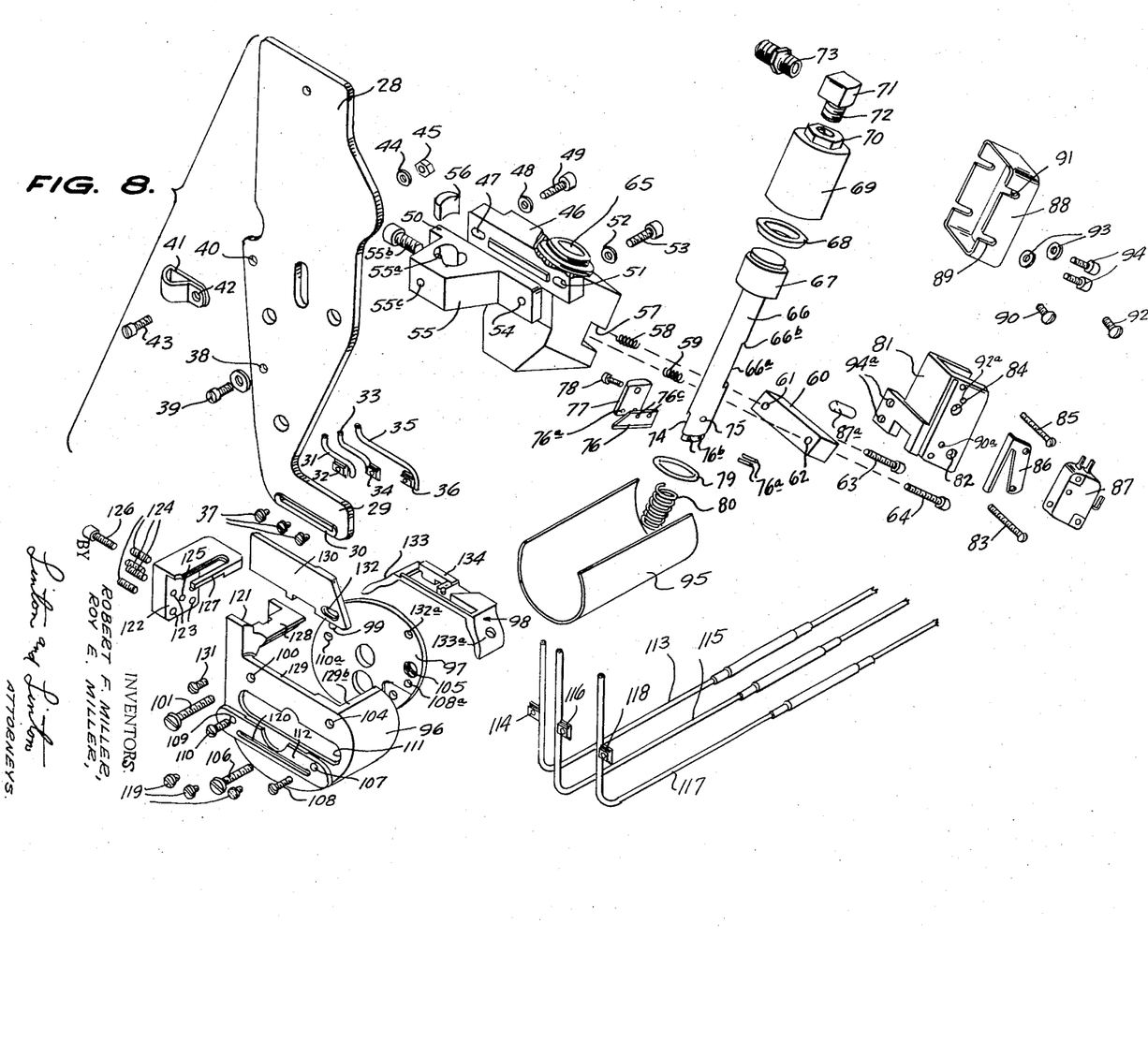
FIG. 8 is an enlarged exploded detailed perspective view of the elements of the sensing and cutting attachment.
Figures 15, 16, 17, 18:
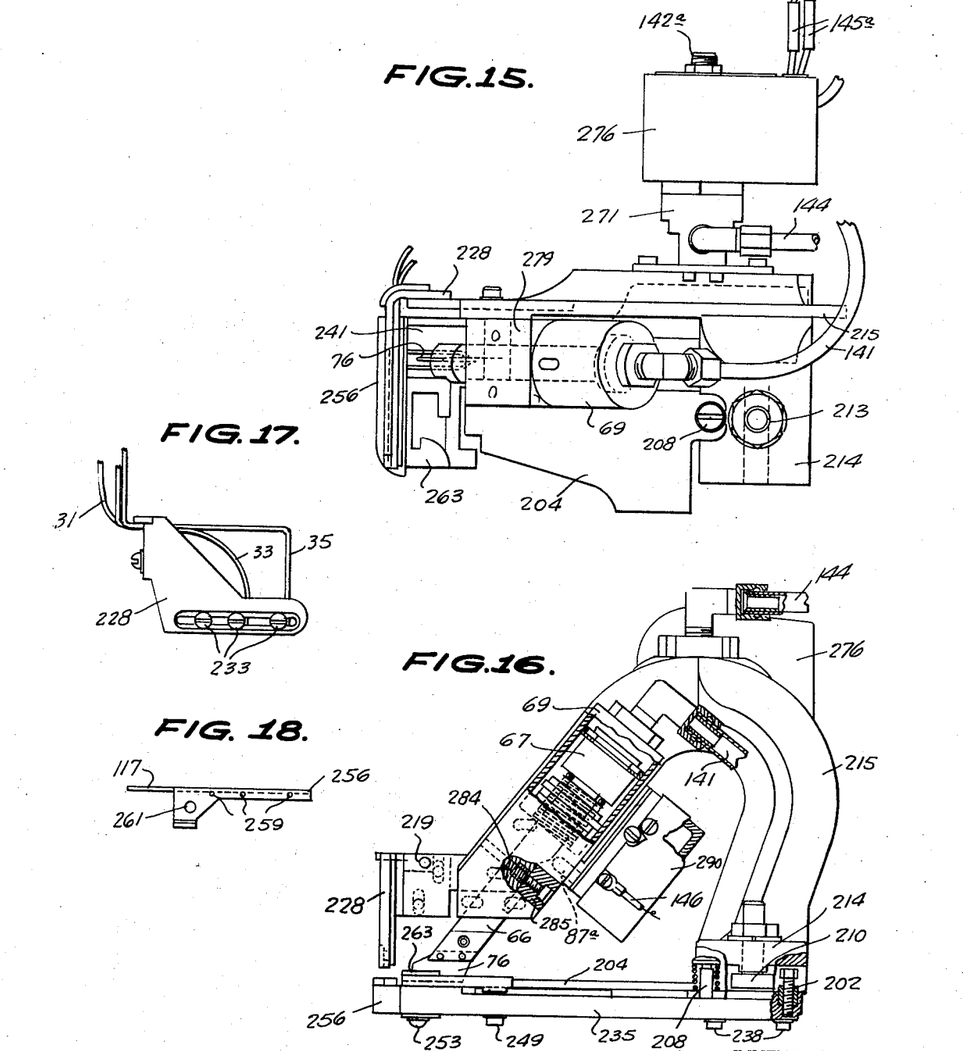
FIG. 15 is a top view of a modified form of cutting and sensing attachment.
FIG. 16 is a side elevation partly in section of FIG. 15.
FIG. 17 is an end view of the top sensor element.
FIG. 18 is an end view of the bottom sensor element.
Figure 19:
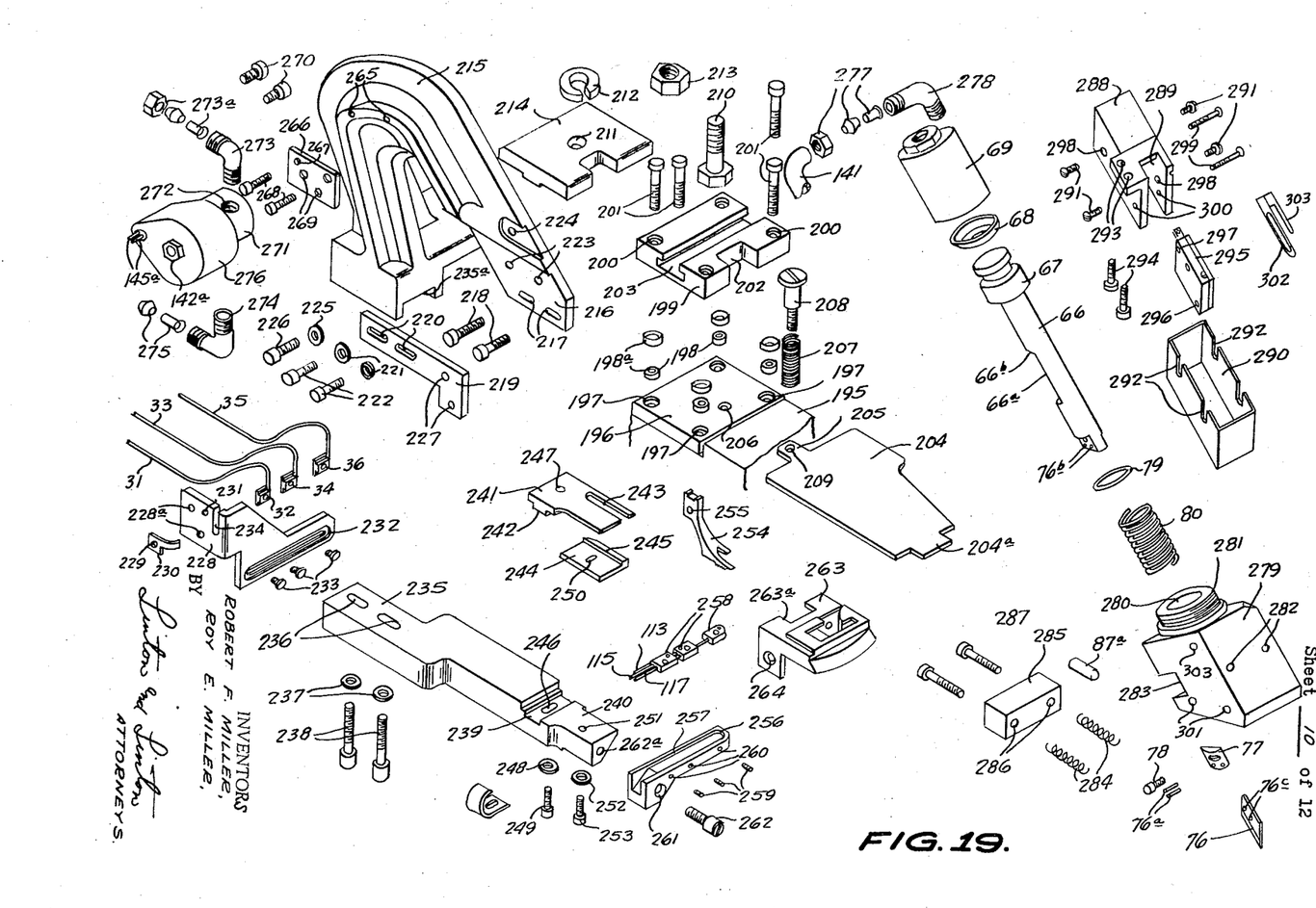
FIG. 19 is an enlarged exploded view of said modified form of cutting and sensing attachment.
Figures 20, 21, 22, 23:
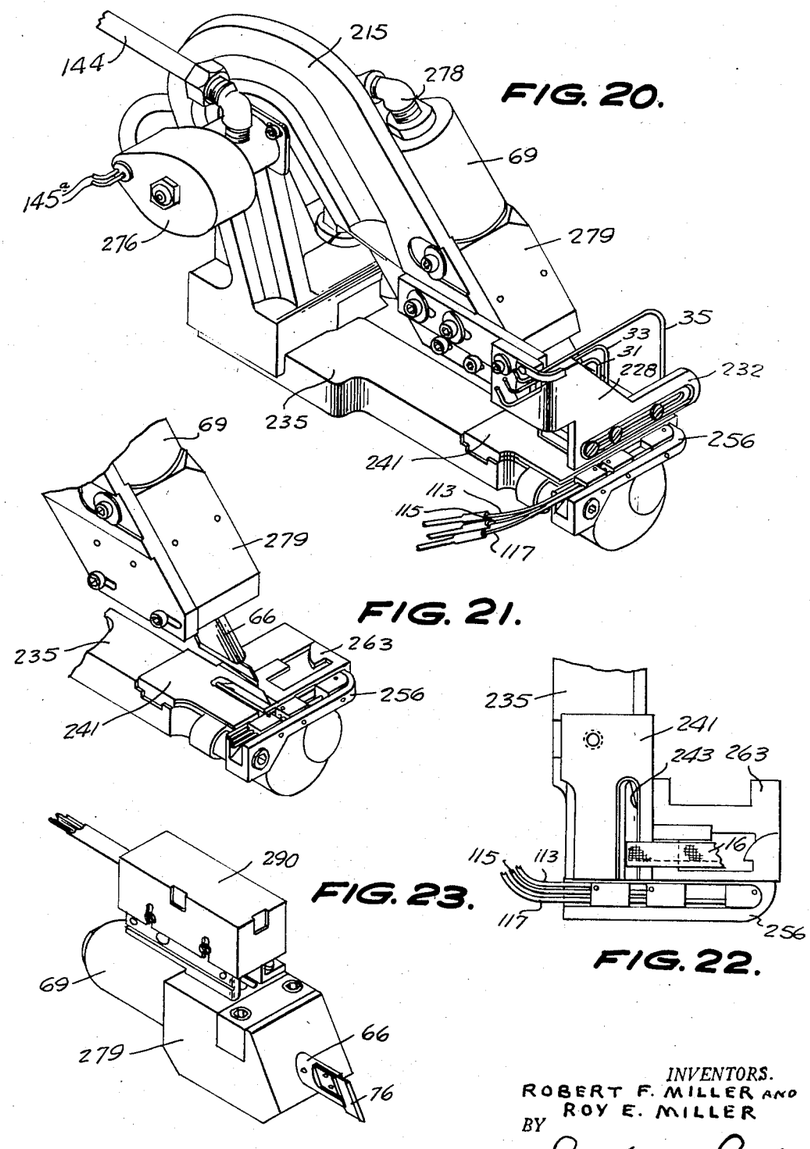
FIG. 20 is an enlarged perspective view of the modified cutting and sensing attachment taken from the top of FIG. 15.
FIG. 21 is a partial end perspective view of FIG. 20 with the sensing elements removed.
FIG. 22 is a further enlarged top view of the sensor end portion of FIG. 20 with the top sensor elements removed.
FIG. 23 is a bottom perspective view of the cutting element of FIG. 20.

Tube 141 is also fastened by coupling 277 to nipple 278 joined to cylinder 69 having piston ring 68 and piston 67 slidably mounted therein. Said piston has ring 79, spring 80 and cutting blade 76 as described in the form as shown in FIG. 8 with piston rods 66 extending into bore 280 in the cylinder block 279 while cylinder 69 is in threaded engagement with thread 281 of said cylinder block. Said cylinder block has openings 282, a rear recess 283 with springs 284 and block 285 mounted in said recess against the recess 66a in piston rod 66 and retaining in position by screws 287 extending through openings 286, springs 284 into threaded openings 282. Plunger 87a is slidably mounted in said piston block as best shown in FIG. 16 for being moved by cam 66b of said piston rod.

A micro-switch supporting block 288 has a recess 289. A cover 290 for said micro-switch block has recesses 292 for receiving screws 291 which extend into openings 298 of said block and retaining said cover thereon. Said block further has openings 293 into which extend screws 294 into threaded openings (not shown) in the rear of said cylinder for retaining the same together. Micro-switch 295 is positioned in block recess 289 and has openings 296 and 297 while screws 299 extend through openings 300 of block 288 and openings 296 and 297 of said micro-switch retaining the same together. A spring 302 having a spring arm 303 is positioned between the contact of the micro-switch and plunger 87a for activating said micro-switch when said plunger is moved.

The operation of the sensor and cutting element of FIGS. 15–19 inclusive is substantially the same as described for the modification shown in FIGS. 4 to 8 inclusive. That is the sensor tubes 31, 33 and 35 are adjustably positioned relative to tubes 113, 115 and 117 for sensing the passages of the work piece therebetween and operating the present system shown in FIGS. 9a and 9b so that when air is passed to tube 141 piston rod 66 is lowered against spring 80 and the knife blade 76 cooperates with the knife cutting bar 241 and knife follower 244 severs the binding tape 16 thereon and at the same time cam 66b operates plunger 87a and thus microswitch 295 in a similar manner to that previously described. Likewise solenoid valve 271 functions in the same manner as solenoid valve 142.

Knee-switch 7g is normally open in that spring 311 by its end 311a tends to pivot knee plate 312 away from micro-switch plunger 314 and stop 315 against screw 317. However, the operator can by using a knee push knee plate 312 against plunger 314 closing micro-switch 318 when desired.

Sensing tubes 31, 33 and 35 can be omitted without changing operation as they mainly blow lint away.

The present invention is capable of considerable modification and such changes thereto as come within the scope of the appended claims are deemed to be a part of the invention.

We claim:

1. In a sewing machine for attaching a binding tape to a work piece, means for severing said binding tape comprising a pneumatically operated cutting blade positioned for moving into cutting engagement with the binding tape adjacent to the work piece to which it is being attached, pneumatic control means positioned in the path of the work piece during the attaching of the binding tape thereon, an electrical switch forming part of said pneumatic control means and actuated thereby, an electrically operated valve connected to said pneumatically operated cutting blade for passing operating air thereto, and electrical means connecting said electrical switch and said electrically operated valve, said pneumatic control means including a tube having a free open end positioned in the path of the work piece for engagement with said work piece whereby the pneumatic flow through said free end of said tube is substantially reduced, said electrical switch being air-operated and connected to the other end of said tube, and means for supplying air under pressure to said air-operated electrical switch, whereby movement of the work piece against the free end of the tube increases the pressure in said tube and actuates said switch to operate said valve and pass air to the cutting blade to initiate the action of said blade.

2. In a sewing machine for attaching a binding tape to a work piece, means for severing said tape as claimed in claim 1, wherein said pneumatic control means includes a second tube positioned in the path of the work piece, each tube having a free end facing, but spaced from the free end of the other of said tubes, said electrical switch being connected to the other end of said second tube whereby movement of the work piece between said facing tube ends initiates the action of the cutting blade.

3. In a sewing machine for attaching a binding tape to a work piece, means for severing said tape as claimed in claim 1, wherein said pneumatic control means includes a second tube having a free end positioned in the path of the work piece after it leaves the first mentioned tube, a second air operated electrical switch connected to said second tube, and means for supplying air under pressure to said second air operated electrical switch whereby movement of the work piece across the free end of the second tube initiates the action of the cutting blade a second time.

4. In a sewing machine for attaching a binding tape to a work piece, means for severing said tape as claimed in claim 2, wherein said pneumatic control means includes a second pair of tubes having ends facing one another but spaced apart for the passage of the work piece after it leaves the first mentioned tubes, a second air operated electrical switch connected to said second pair of tubes, and means for supplying air under pressure to said second air operated electrical switch whereby said cutting blade is operated a second time for severing said binding tape on the work piece when it passes between said second tube ends.

5. In a sewing machine for attaching a binding tape to a work piece, means for severing said binding tape as claimed in claim 2 including a second pair of tubes having ends facing one another but spaced apart for the passage of the work piece after it leaves the first mentioned tubes, a second air operated electrical switch connected to said second pair of tubes, and means for supplying air under pressure to said electrically operated valve whereby said knife blade is operated a second time for severing said binding tape on the work piece when it passes between said second tube ends, said electrical means including a microswitch operatively connected to said cutting blade and electrically to said electrically operated valves, a plurality of relays electrically connected to said microswitch and both said electrical switches whereby cutting movement of said cutting blade activates one relay closing said electrically operated valve, return movement of said cutting blade activates a second relay electrically disconnecting said first mentioned electrical switch, movement of said work piece between said second tubes activates a third relay electrically disconnecting said second mentioned electrical switch until the work piece leaves said second tubes and said second electrical switch then opens said electrically operated valve with said cutting blade making a second cut of said binding tape on the work piece and operating said micro-switch and thereby a fourth relay releasing said relays.

6. In a sewing machine for attaching a binding tape to a work piece means for severing said binding tape as claimed in claim 5 said pneumatically operated cutting blade includes a cylinder connected to said first electrically operated valve for receiving air therefrom, a piston slideably mounted in said cylinder, a knife blade connected to said piston, said micro-switch is mounted on said cylinder, and a plunger is slideably mounted in said cylinder and positioned for being moved by said piston and for operating said micro-switch when so moved.

7. In a sewing machine for attaching a binding tape to a work piece, means for severing said binding tape as claimed in claim 2 including a plate connected to said machine and extending adjacent the attaching elements thereof, one of said tubes being adjustably connected to said plate, and a second of said tubes being adjustably connected to said machine.

8. In a sewing machine for attaching a binding tape to a work piece, means for severing said binding tape as claimed in claim 2 including a plate connected to said machine and extending adjacent the attaching elements thereof, one of said tubes being adjustably connected to said plate, and a second of said tubes being adjustably connected to said machine and said pneumatically operated cutting blade being connected to said plate.

9. In a sewing machine for attaching a binding tape to a work piece, means for severing said binding tape as claimed in claim 2 including an extension arm connected to said machine, a curved support mounted on said base arm, a cylinder connected to said curved support and extending towards said extension arm, a piston slideable in said cylinder, said electrically operated valve being connected to said cylinder for supplying air thereto to move said piston, resilient means tending to retain said piston, a knife blade connected to said piston, a knife cutting bar connected to said extension arm for cooperating with said knife blade in cutting tape when said knife blade is moved against said resilient means, by air against said piston, a plate connected to said cylinder adjustably supporting one of said two tubes and a holder connected to said extension arm adjustably supporting the other of said two tubes.

10. In a sewing machine for attaching a binding tape to a work piece means for severing said binding tape as claimed in claim 5 including an extension arm connected to said machine, a cylinder mounted on said extension arm and extending towards the same, a piston slideable in said cylinder, a knife blade connected to said piston, resilient means tending to retain said piston inwardly of said cylinder, said electrically operated valve being connected to said cylinder for supplying air thereto to move said piston against said resilient means, a knife cutting bar connected to said extension arm for cooperating with said knife blade in cutting tape when said knife blade is moved against said resilient means, said micro-switch being mounted on said cylinder and a plunger carried by said cylinder for being moved by said piston against said micro-switch for operating the same.

11. In a sewing machine having a sewing head above a base arm, an attachment therefor for severing binding tape to be sewn on said sewing machine comprising a cylinder connected to said sewing machine, a piston with piston rod slideable in said cylinder, a spring tending to retain said piston inwardly of said cylinder, a knife blade connected to said piston rod, a knife cutting bar connected to said base arm for cooperating with said knife blade in cutting said binding tape, a micro-switch operable by said piston rod, a plurality of air operated micro-switches, a plurality of tubes connected to said cylinder, a second plurality of tubes connected to said base arm each with an end facing, but spaced from an end of one of said first mentioned plurality of tubes, each pair of facing tubes being connected to one of said air operated micro-switches, a solenoid valve connected to said cylinder and said air operated micro-switches, a source of air under pressure connected to said solenoid valve and said air operated micro-switches and electrical means connected to said solenoid valve, said air operated micro-switches and said piston rod operated micro-switch whereby said solenoid valve is operated to move said knife blade as a work-piece moves between one pair of said facing tube ends and again after the work piece leaves a second pair of said facing tube ends.

References Cited

UNITED STATES PATENTS

| | | |
|---|---|---|
| 2,539,131 | 1/1951 | Gundersen et al. __________ 112 |
| 2,685,664 | 8/1954 | Visconti ___________ 112—130 |
| 2,705,466 | 4/1955 | Sargrove et al. ______ 112—130 |
| 3,156,204 | 11/1964 | Harnish et al. _________ 112—2 |
| 3,204,591 | 9/1965 | Pickett _____________ 112—2 |
| 3,252,437 | 5/1966 | Pickett ________________ 112 |

JORDAN FRANKLIN, *Primary Examiner.*

H. HAMPTON HUNTER, *Assistant Examiner.*

U.S. Cl. X.R.

112—219; 83—370; 137—83; 73—37.7